United States Patent [19]
Hedberg

[11] Patent Number: 6,166,570
[45] Date of Patent: Dec. 26, 2000

[54] OUTPUT BUFFER CIRCUIT WITH SWITCHABLE COMMON MODE OUTPUT LEVEL

[75] Inventor: Mats Hedberg, Haninge, Sweden

[73] Assignee: Telefonaktiebolaget LM Ericsson, Stockholm, Sweden

[21] Appl. No.: 09/304,047

[22] Filed: May 4, 1999

[30] Foreign Application Priority Data

May 6, 1998 [DE] Germany .......................... 198 20 248

[51] Int. Cl.[7] .............................. H03B 1/00; H03K 3/00
[52] U.S. Cl. .......................... 327/108; 327/109; 327/112; 327/530; 326/26; 326/27; 326/81; 330/252; 330/310
[58] Field of Search ........................... 327/108–112, 170, 327/530; 326/31–33, 26, 27, 81–83, 86, 87; 330/252, 310

[56] References Cited

U.S. PATENT DOCUMENTS

| | | | |
|---|---|---|---|
| 5,298,800 | 3/1994 | Dunlop et al. | 327/108 |
| 5,508,570 | 4/1996 | Laber et al. | 327/563 |
| 5,557,238 | 9/1996 | Weiss | 330/258 |
| 5,608,352 | 3/1997 | Itakura | 330/252 |
| 5,864,254 | 1/1999 | Tashiro | 327/319 |
| 5,955,918 | 9/1999 | Uno | 330/9 |
| 5,963,047 | 10/1999 | Kwong et al. | 326/27 |

*Primary Examiner*—Kenneth B. Wells
*Assistant Examiner*—Long Nguyuen
*Attorney, Agent, or Firm*—Nixon & Vanderhye, P.C.

[57] ABSTRACT

The present invention concerns an output buffer circuit with a switchable common mode output voltage level. An output buffer circuit according to the invention comprises a plurality of output stages (1,2) for driving a symmetrical transmission line (RT). A power supply circuit (U1,U2) provides an upper power supply potential (Vbh) and a lower power supply potential (Vbl) for the output stages (1,2). The power supply circuit is adapted to provide the lower power supply potential (Vbl) at different levels in accordance with a configuration signal (En). Depending on the configured lower power supply potential (Vbl) of the output stages (1,2) at least one of the output stages is activated or inactivated in order to compensate the effect of the lower power supply potential (Vbl) on the output impedance of the output stages (1,2).

6 Claims, 2 Drawing Sheets

OUTPUT BUFFER CIRCUIT WITH SWITCHABLE COMMON MODE OUTPUT LEVEL

The present invention relates to an output buffer circuit for driving a symmetrical transmission line, with a switchable common mode level.

In digital systems a variety of signal transmission standards has been developed. Differential signaling schemes are commonly adopted for high speed data transmission between different system sections, using a symmetrical transmission line. The term "symmetrical transmission line" relates to transmission lines comprising two signal wires in a symmetrical arrangement to each other (e.g. twisted pair, two parallel traces close to each other on a printed circuit board, etc.) and also to structures having two independent transmission lines for transmitting two complementary data signals (e.g. a pair of coaxial cables or two independent microstrip lines on a printed circuit board). In order to ensure a proper and reliable transmission of differential data signals, it is necessary that the output buffer circuit driving the transmission line provides a differential signal amplitude and a common mode voltage on the symmetrical transmission line which comply with the expectations of the particular receiver connected to the other end of the transmission line.

Moreover, in order to achieve high speed transmission of signals with a minimum of distortion, it is advantageous to match the characteristic impedance of the transmission line. Good signal quality can be maintained by means of matching not only the termination impedance but also the source impedance of the output buffer with the characteristic impedance of the transmission line.

It is the object of the present invention, to provide an output buffer circuit for driving a symmetrical transmission line which can be configured in accordance with a control signal, to operate at different common mode output voltage levels while essentially maintaining its output impedance.

According to the present invention, this object is solved as defined in claim 1. Advantageous embodiments are given in the dependent claims.

According to the invention, a first driver circuit and at least one second driver circuit are provided for driving the transmission line in accordance with a data input signal. Different common mode voltages at the output of the buffer circuit are achieved by means of providing different operating modes of the power supply circuit supplying the driver circuits in accordance with a configuration signal. The driver circuits are enabled and disabled in accordance with the operating mode of the power supply circuit such that variations in the output impedance of the buffer are compensated.

The present invention is advantageous in that it allows to configure the output buffer circuit to operate at different common mode output levels e.g. for cooperation with different types of receivers. It can essentially maintain its source impedance in the different operating modes such that source matching can be achieved without additional means at the transmitter side.

According to an exemplary embodiment, both the first and the second driver circuits are bridge circuits each comprising a quadruple of transistors. Each bridge circuit provides a certain source impedance. The driver circuits are interconnected such that all enabled driver circuits together drive the transmission line in accordance with two complementary data input signals while a disabled circuit does not contribute to driving the transmission line.

Enabling and disabling of driver circuits can take place in a number of different ways. According to one exemplary embodiment, a driver circuit is enabled by supplying the data input signals to its inputs, and is disabled by switching all transistors of the bridge into a high impedance state. According to another exemplary embodiment, gate circuits are provided in the power supply paths to the driver and/or between the output of the driver and the output of the buffer circuit, which gates receive enabling and disabling control signals.

In the following, preferred embodiments of the invention will be described with reference to the accompanying figures.

Figure 1:
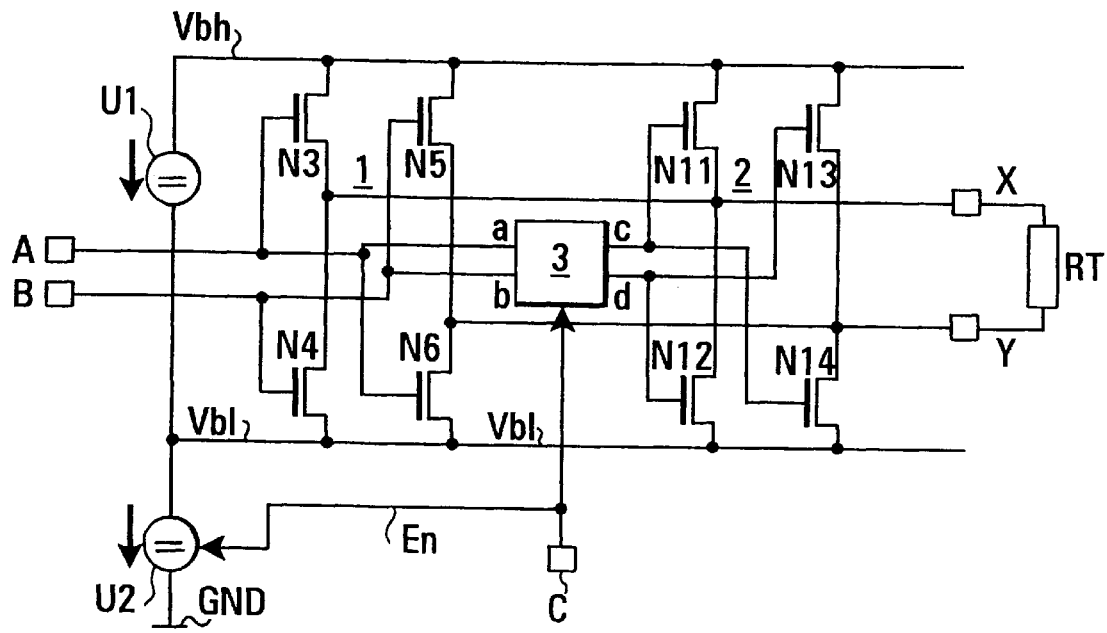
FIG. 1 shows a first embodiment of an output buffer circuit according to the present invention.

FIG. 1 shows a first embodiment of an output buffer circuit according to the present invention. In this figure, reference numeral 1 denotes a first driver circuit consisting of a quadruple of NMOS transistors N3 to N6. Transistors N3 to N6 of the first driver circuit are connected to constitute a bridge. The drains of transistors N3 and N5 are connected together to constitute a first node of the bridge. The sources of transistors N4 and N6 are connected together to constitute a second node of the bridge. The drain of transistor N4 and the source of transistor N3 are connected together to constitute a third node of the bridge. The drain of transistor N6 and the source of transistor N5 are connected together to constitute a fourth node of the bridge. The third node of the bridge is connected with an output terminal X. The fourth node of the bridge is connected to an output terminal Y. A symmetrical transmission line, symbolized by its characteristic impedance RT in FIG. 1, is connected to the output terminals X and Y. A voltage source U1 is connected to provide an upper power supply potential Vbh to the first node of the bridge 1 and a lower power supply potential Vbl to the second node of the bridge 1. The gates of the transistors N3 and N6 are connected together and with an input terminal A. The gates of transistors N4 and N5 are connected together and with an input terminal B. The input terminals A and B are connected to receive respective digital input signals with complementary logical levels, each logical level corresponding to a predetermined input voltage provided by signal processing circuitry not shown in FIG. 1 and which does not belong to the present invention. U2 denotes a voltage source connected between ground and the second node of the bridge circuit 1 receiving the lower power supply potential Vbl. The voltage source U2 in FIG. 1 receives an enable signal for controlling the voltage generated by the voltage source U2. Depending on the logical state of the enable signal, the voltage source U2 raises the potential Vbl to a first level above ground or keeps the potential Vbl at a second level lower than the first level. The second level can e.g. be the ground level GND. If the voltage source U1 outputs a constant voltage across the first and the second node of the bridge circuit 1, both the lower power supply potential Vbl and the upper power supply potential Vbh can be shifted by substantially the same amount by means of enabling and disabling the voltage source U2.

The complementary input signals at the input terminals A and B result in that either the transistors N3 and N6 are conducting while transistors N4 and N5 are non-conducting, or that transistors N3 and N6 are non-conducting while transistors N4 and N5 are conducting. The ON-impedances of the transistors in the currently conducting diagonal determine the source impedance provided by bridge circuit 1 at the output terminals X and Y.

Reference numeral 2 denotes a second driver circuit. The second driver circuit comprises a quadruple of transistors N11 to N14. The transistors N11 to N14 are connected to constitute a bridge. The drains of transistors N11 to N13 are connected together to constitute a first node of the second driver circuit. The sources of transistors N12 and N14 are connected together to constitute a second node of the second driver circuit. The drain of transistor N12 is connected to the source of transistor N11 to constitute a third node of the second driver circuit. The drain of transistor N14 is connected to the source of transistor N13 to constitute a fourth node of the second driver circuit. The first node of the second driver circuit is connected with the first node of the first driver circuit and thus receives the upper power supply potential Vbh. The second node of the second driver circuit is connected with the second node of the first driver circuit and thus receives the lower power supply potential Vbl. The third node of the second driver circuit is connected with the output terminal X. The fourth node of the second driver circuit is connected with the output terminal Y. The gates of transistors N11 and N14 are connected together. Moreover, the gates of transistors N12 and N13 are connected together.

Reference numeral 3 denotes an enable circuit for enabling and disabling the second driver circuit. The enable circuit receives an enable signal corresponding to the enable signal received by the voltage source U2, for configuring the operating mode of the output buffer circuit. Depending on the logical state of this enable signal, the enable circuit 3 either connects the input signal at input terminal A to the gates of the transistors N11 and N14 and connects the input signal at input terminal B to the gates of transistors N12 and N13, or the enable circuit 3 disables the second driver circuit 2 by means of pulling the gates of all four transistors N11 to N14 to ground GND. In this way, the enable circuit 3 controls the second driver circuit either to contribute to driving the transmission line at the output terminal X and Y or to disable the second driver circuit such that no power is fed into the transmission line through the second driver circuit. While according to the embodiment of FIG. 1, the enable circuit 3 is located in the input signal path, i.e. between the gates of the second bridge 2 and the input terminals A, B, it is equally feasible to provide the enable circuit between the output terminals X, Y and the output nodes of the second bridge, i.e. the third and the fourth node, or to provide the enable circuit 3 in the power supply path to the second bridge 2, i.e. between the voltage source U1 on the one hand and the first and second nodes of bridge 2 on the other hand. Moreover, also combinations of these alternatives would achieve the same effect, namely to enable and disable the second driver circuit in accordance with a control signal En.

When enabled by the enable circuit 3, the transistors of the currently conducting diagonal of the bridge 2 are effectively connected in parallel with the respective transistors in the currently conducting diagonal of the bridge 1. Accordingly, when the second driver circuit 2 is enabled, the source impedance of the output buffer circuit at the output terminals X and Y results from the parallel connection of the ON-impedances of the currently conducting upper transistors of the bridges 1 and 2 plus the parallel connection of the ON-impedances of the currently conducting lower transistors of the bridges 1 and 2.

Depending on the configuration signal at the configuration terminal C, the output buffer circuit of FIG. 1 operates in the following modes. When a first configuration signal level is applied to terminal C, the voltage source U2 outputs a first voltage which raises the potential Vbl to a first level. Moreover, the enable circuit 3 activates the second driver circuit 2 such that both the first and the second driver circuit 1 and 2 together drive the transmission line at the output terminals X and Y.

In a second operating mode, the voltage source U2 outputs a voltage lower than the voltage output by U2 in the first operating mode. Moreover, the enable circuit 3 keeps the second driver circuit 2 disabled. In this operating mode, only the first driver circuit 1 drives the transmission line and the source impedance of the output buffer circuit is determined by the ON-impedances of the transistors in the currently conducting diagonal of bridge 1. The voltage output by voltage source U2 determines the common mode output voltage level at the output terminals X and Y while the voltage output by U1 determines the signal amplitude across the output terminals X and Y. If the output buffer circuit of FIG. 1 is configured to output a low common mode voltage level at the terminals X and Y, the operating point of the transistors in the bridge circuit 1 is different from the operating point of these transistors when voltage source U2 outputs a high voltage, because the gate source voltage of the currently conducting transistor determines its ON-impedance. This gate source voltage depends on the voltage output by the voltage source U2. By enabling the second driver circuit 2 when the voltage source U2 is configured to output the higher voltage, and disabling the second driver circuit 2 when the voltage source U2 is configured to output the lower voltage, it is possible to maintain the same source impedance at the output terminals X and Y in both operating modes of the output buffer.

Preferably, the channel width and length of the transistors in the first driver circuit 1 are selected such that when the voltage source U2 outputs the lower voltage level, the ON-impedance of the currently conducting diagonal of the bridge 1 matches the characteristic impedance RT of the transmission line. The channel width and length of the transistors of the second driver circuit 2 are preferably selected such that the ON-impedance of the currently conducting transistors in the second driver circuit 2 in parallel with the respective ON-impedances of the currently conducting transistors in the first driver circuit 1 for Vbl at the higher level, are at least approximately equal to the resepctive ON-impedances of the driver circuit 1 for Vbl at the lower level. In this way it is possible to maintain substantially the same source impedance of the output buffer circuit in all its operating modes.

Figure 2:
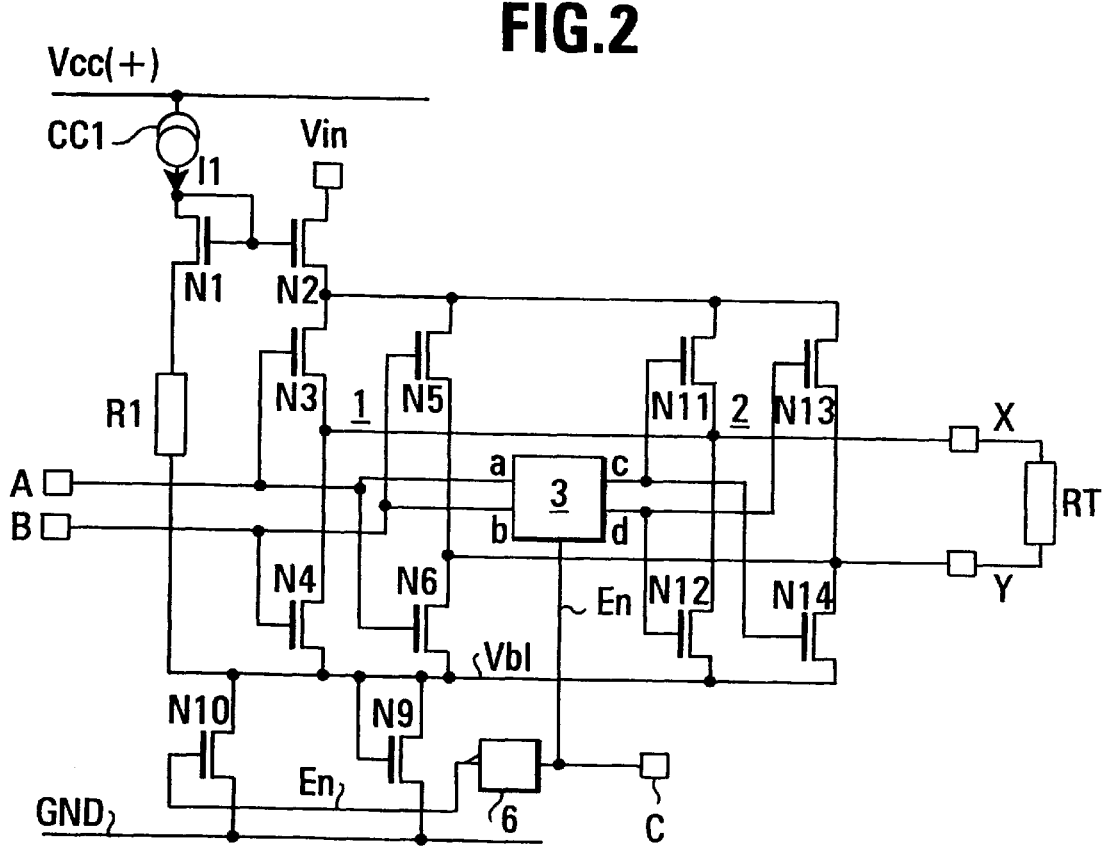
FIG. 2 shows a second embodiment of an output buffer circuit according to the present invention.

FIG. 2 is a second embodiment of an output buffer circuit according to the present invention. Elements of this embodiment which are similar or identical with corresponding elements of the embodiment shown in FIG. 1, are denoted with the same reference numerals. Regarding the description of these elements, reference is made to the description given for FIG. 1 in order to avoid repetitions.

In FIG. 2, CC1 denotes a constant current source for providing a constant current I1. N1 denotes an NMOS transistor having its gate and its drain connected together. R1 denotes a resistor. One terminal of R1 is connected with the source of transistor N1. N10 denotes an NMOS transistor having its drain connected to the other terminal of resistor R1. The source of transistor N10 is connected to ground GND. N9 denotes an NMOS transistor having its drain connected with the drain of transistor N10. The source of transistor N9 is connected with ground GND. Drain and gate of transistor N9 are connected together. The drains of transistors N10 and N9 are connected to the sources of transistors N4, N6, N12 and N14, i.e. with the lower power supply line Vbl of the bridge circuits 1 and 2. N2 denotes an NMOS transistor having its gate connected with the gate of transistor N1. The source of transistor N2 is connected with the drains of transistors N3, N5, N11 and N13, i.e. with the upper power supply line Vbh of the bridge circuits 1 and 2. Reference numeral 6 denotes an inverter for inverting the configuration signal applied to the configuration terminal C. The output of inverter 6 is connected with the gate of transistor N10.

The drain of transistor N2 is connected with a power-supply terminal Vin for connection with an external power supply. In the alternative (not shown in FIG. 2), the drain of transistor N2 is connected with the internal positive power supply line Vcc of the output buffer circuit. The provision of the external power supply terminal Vin is advantageous in that it allows to connect an external power source with a voltage adapted to the particular operating conditions of a particular application, such that power dissipation in the buffer circuit can be kept minimum.

In the embodiment of FIG. 2, the constant current source CC1, the transistors N1 and N2 and the resistor R1 constitute one particular exemplary embodiment of the voltage source U1 depicted in FIG. 1. The inverter 6 and the transistors N9 and N10 are one particular exemplary embodiment of the voltage source U2 depicted in FIG. 1.

In operation, the transistors N1 and N2 constitute a voltage mirror. The constant current source CC1 forces a constant current I1 through transistor N1 and through resistor R1. The gates of transistors N1 and N2 are connected together such that substantially the same voltage as the voltage drop across R1, develops between the upper power supply line Vbh and the lower power supply line Vbl.

The parallel connection of the drain source paths of the transistors N9 and N10 and the connection of the gate and drain of transistor N9 together results in that if transistor N10 is in the non-conducting state, the constant current I1 flows through transistor N9 and generates a voltage drop corresponding to the threshold voltage across the drain and the source of this transistor. This voltage drop raises the lower power supply potential Vbl and similarly, raises the upper power supply potential Vbh. If, on the other hand, the transistor N10 receives a high gate potential from the inverter 6 and thus, is in the conducting state, transistor N10 will short circuit transistor N9 resulting in substantially no voltage drop across transistor N9. Accordingly, the lower power supply potential Vbl approximates the ground potential and the upper power supply potential Vbh takes a lower value than in the case that transistor N10 is switched off. When transistor N10 is switched off, the enable circuit 3 activates the second driver circuit 2. When transistor N10 is switched on, the enable circuit 3 disables the second driver circuit 2 such that in both operating modes, the source impedance provided by the output buffer circuit at the terminals X and Y can remain substantially unchanged.

Figure 3:
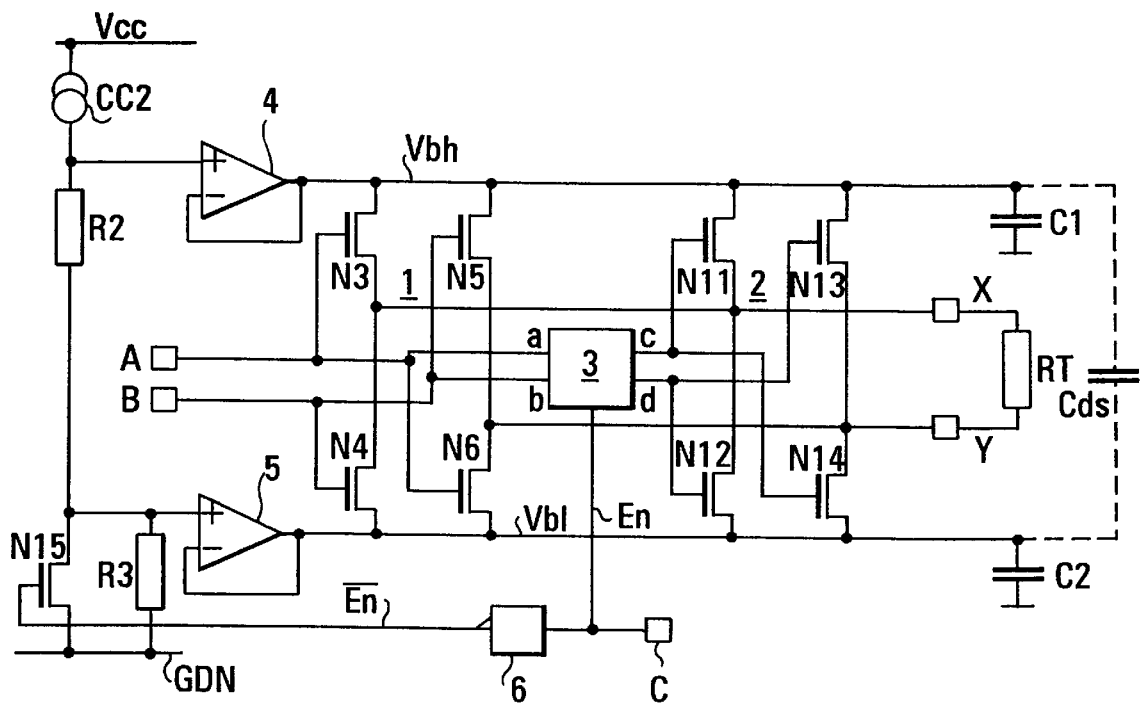
FIG. 3 shows a third embodiment of an output buffer circuit according to the present invention.

FIG. 3 shows a third embodiment of an output buffer circuit according to the present invention. In this embodiment, elements which are similar or identical with corresponding elements of the previous embodiments, are denoted with the same reference numerals. Concerning the description of these elements, reference is made to the description of the previous embodiments in order to avoid repetitions.

In this embodiment, reference numerals 4 and 5 denote operational amplifiers for providing the upper power supply potential Vbh and the lower power supply potential Vbl, respectively, for the first driver circuit 1 and the second driver circuit 2. Each of these operational amplifiers has a non-inverting input and an inverting input and an output. The output of the respective operational amplifier is fed back to its inverting input in order to achieve a unity voltage gain for each of the amplifiers 4 and 5. Each of the amplifiers 4 and 5 receives a reference voltage at its non-inverting input. Each amplifier acts as an impedance converter for reducing the impedance of the respective reference voltages.

Reference numeral CC2 denotes a constant current source. R2 and R3 denote resistors. N15 denotes an NMOS transistor. Vcc denotes the positive power supply potential of the output buffer circuit. The amplifiers 4 and 5 receive their power supply either from Vcc or from an external power source. The transistor N15 has its drain source path connected in parallel to resistor R3. The constant current source CC2, the resistor R2 and the parallel connection of N15 and R3 are connected in series. The non-inverting input of the upper amplifier 4 is connected with the terminal of resistor R2 connected with the constant current source CC2. The non-inverting input of amplifier 5 is connected with the terminal of resistor R2 connected with the drain of transistor N15 and with R3.

In operation, the constant current source CC2 generates a current through the series connection of resistor R2 and the parallel connection of resistor R3 with transistor N15. If the configuration signal at the configuration input C is at a high level, inverter 6 outputs a low signal to the gate of transistor N15 such that transistor N15 is in the non-conducting state. This results in that the current provided by constant current source CC2 flows through resistor R3. The voltage drop across resistor R3 appears at the non-inverting input of amplifier 5. Due to the unity gain of this amplifier, the lower power supply potential Vbl of the driver circuits 1 and 2 is substantially equal to the voltage drop across resistor R3. The potential at the non-inverting input of amplifier 4 is equal to the sum of the voltage drop across resistor R2 and the voltage drop across resistor R3. Accordingly, due to the unity gain of amplifier 4 the upper power supply potential Vbh of the driver circuits 1 and 2 is by the voltage drop across resistor R2 higher than the lower power supply potential Vbl of the driver circuits 1 and 2. The high level of the configuration signal causes the enable circuit 3 to enable the second driver circuit 2 such that the transmission line at the outputs X and Y is driven by both the driver circuits 1 and 2.

C1 and C2 denote decoupling capacitors connected between the upper power supply potential Vbh and the lower power supply potential Vbl, respectively, and ground. Cds denotes a differential decoupling capacitor connected between Vbh and Vbl. The capacitors C1, C2 and Cds are optional and can, of course, be provided in each of the embodiments according to need. When the configuration signal at the configuration terminal C is at a low level, the inverter 6 outputs a high signal level to the gate of transistor N15 such that this transistor essentially provides a short circuit for resistor R3. This in turn results in that the voltage drop across resistor R3 decreases and that accordingly, the lower power supply potential Vbl takes a value lower than in the first operating mode. Also the upper power supply potential Vbh takes a value lower than in the first operating mode. Moreover, the enable circuit 3 now disables the second driver circuit 2. In this way, the same source impedance of the output buffer circuit at the output terminals X and Y can be maintained for both operating modes.

Figure 4:
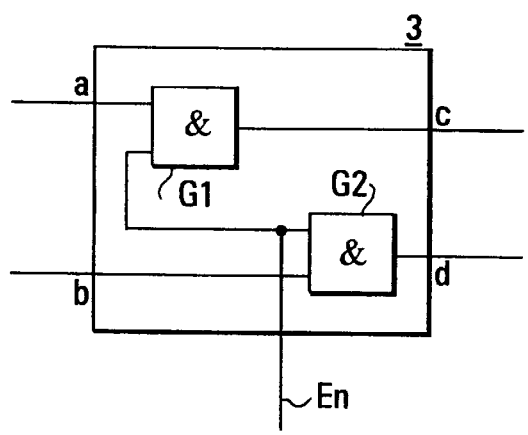
FIG. 4 shows an embodiment of an enable circuit according to the present invention.

FIG. 4 shows an embodiment of the enable circuit 3 used in the embodiments of FIGS. 1 to 3. The enable circuit 3 comprises a pair of inputs a and b, a corresponding pair of outputs c and d and an enable input En. The enable circuit 3 serves to either pass on complementary input signals at the inputs a, b to the outputs c, d or to block the input signals at a and b and pull the outputs c, d low, e.g. to ground such that all transistors in the bridge 2 enter a high impedance state, depending on the logical level of the enable signal En. The embodiment of the enable circuit 3 shown in FIG. 4 comprises a first AND gate G1 and a second AND gate G2. The enable signal En is supplied to a first input of gate G1 and to a first input of gate G2. The input signal a is supplied to a second input of gate G1. The input signal b is supplied to a second input of gate G2. The outputs of the gates G1 and G2 provide the output signals c and d, respectively.

Numerous modifications of the above embodiments will be readily apparent to the skilled person. In the embodiment shown in FIG. 2, the transistor N9 may be replaced by a resistor. Similarly, in the embodiment shown in FIG. 3, the resistor R3 may be replaced by a transistor having its drain and gate connected together. The amplifiers 4 and 5 shown in FIG. 3 can have open collector or open drain output stages. Preferably, both amplifiers 4 and 5 are provided with push-pull output stages in order to achieve approximately linear behavior both in the case that current flows out of the output and in the case that current flows into the output of the amplifier. While the shown embodiments, comprise two driver circuits with the second driver circuit being enabled and disabled depending on the operating mode and the first driver circuit being enabled all the time, it is similarly possible to disable the first driver circuit when enabling the second driver circuit and vice versa. In this case, the transistors of the circuit that is enabled when Vbl is at the higher potential, are preferably selected such that their ON-impedances correspond to the ON-impedances of the transistors of that circuit which is enabled when Vbl is at the lower potential, in order to maintain substantially the same source impedance of the output buffer for both operating modes. This can be achieved by e.g. by means of appropriately selecting the channel width and length of the respective transistors. Moreover, each of the driver circuits may itself consist of more than one bridge circuit connected to operate in parallel with each other.

PMOS transistors may be provided in parallel to at least the upper NMOS transistors of a bridge driver that is enabled when a high common mode output voltage is desired, each PMOS transistor receiving gate signals complementary to the gate signals of the respective NMOS transistor parallel to it. Such respective PMOS transistors improve the linearity of the driver circuit for high common mode output levels and make it possible that Vbh exceeds the gate potential used for turning on the transistors of the bridge.

Also, it is readily apparent that more than two operating modes corresponding to more than two common mode output voltage levels can be implemented easily by means of providing more than two driver circuits and implementing the configurable voltage source U2 such that it can output more than two distinct voltage levels. The more than two driver circuits are then enabled and disabled in accordance with the particular configuration of the voltage source U2, in order to substantially maintain the source impedance for all operating modes.

In the embodiments shown, the potential difference between the upper power supply potential Vbh and the lower power supply potential Vbl remains substantially independent from the particular operating mode.

If it is desired to configure the amplitude of the data signals transmitted over the transmission line, this can be achieved by providing this potential difference configurable, e.g. by means of embodying the current source CC1 in FIG. 2 or CC2 in FIG. 3 to be able to output a current the size of which depends on a configuration signal. This configuration signal can be independent from the common mode output voltage configuration signal or it can be derived from this configuration signal.

It is equally well feasible to keep the upper power supply potential Vbh at a constant level independent from the particular operating mode e.g. by means of connecting the upper power supply line of the first and the second driver circuits to the power supply line Vcc of the output buffer circuit.

What is claimed is:

1. An output buffer circuit for driving a symmetrical transmission line, comprising
    a first driver circuit (1) having a signal input (A, B) for receiving a data signal to be transmitted, an upper and a lower power supply input node and a pair of output nodes (X, Y) for connection with said transmission line (RT);
    a power supply circuit (U1, U2) for supplying an upper power supply potential (Vbh) to said upper power supply node and a lower power supply potential (Vbl) to said lower supply node of said first driver circuit (1);
    said power supply circuit (U1, U2) being adapted to provide said lower power supply potential (Vbl) at one of at least a first predetermined level and a second predetermined level higher than said first predetermined level, in accordance with a configuration signal (En);
    a second driver circuit (2) adapted to drive said transmission line (RT); and
    an enable circuit (3) for activating said second driver circuit (2) when said power supply circuit (U1, U2) outputs said lower power supply potential (Vbl) at said higher level, and for inactivating said second driver circuit (2) when said power supply circuit (U1, U2) outputs said lower power supply potential (Vbl) at said lower level.

2. An output buffer circuit according to claim 1, wherein said first driver circuit (1) comprises
    a first pair of transistors (N3, N4) and a second pair of transistors (N5, N6) connected as a bridge; and
    said second driver circuit (2) comprises
    a third pair of transistors (N11, N12) and a fourth pair of transistors (N13, N14) connected as a bridge.

3. An output buffer circuit according to claim 2, wherein said enable circuit (3) is adapted to inactivate said first driver circuit (1) when activating said second driver circuit (2).

4. An output buffer circuit according to claim 3, wherein the channel width of the transistors (N11 to N14) of said second driver circuit (2) is larger than the channel width of corresponding transistors (N3 to N6) of said first driver circuit (1).

5. An output buffer circuit according to claim 2, wherein said enable circuit (3) is adapted to keep the first driver circuit (1) enabled when said second driver circuit (2) is enabled.

6. An output buffer circuit according to claim 2, wherein the dimensions and physical parameters of said transistors (N3 to N6, N11 to N14) are selected such that the output impedance at said output terminals (X, Y) is substantially the same for the lower level and the higher level of said lower power supply potential (Vbl).

* * * * *